Oct. 29, 1929.    O. H. BRUBAKER    1,733,859
FURNITURE LEG ATTACHING PIECE
Filed Nov. 5, 1928
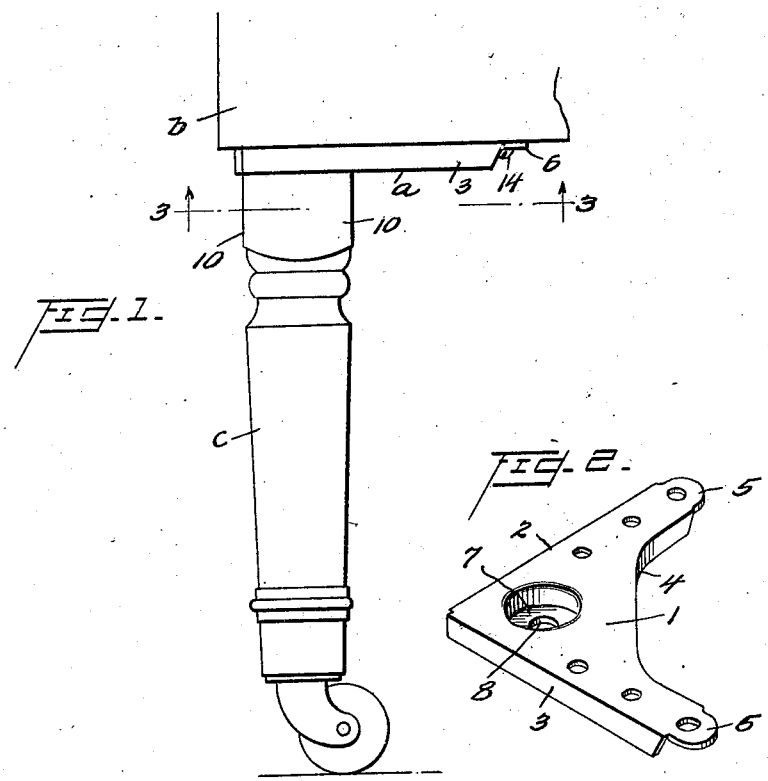
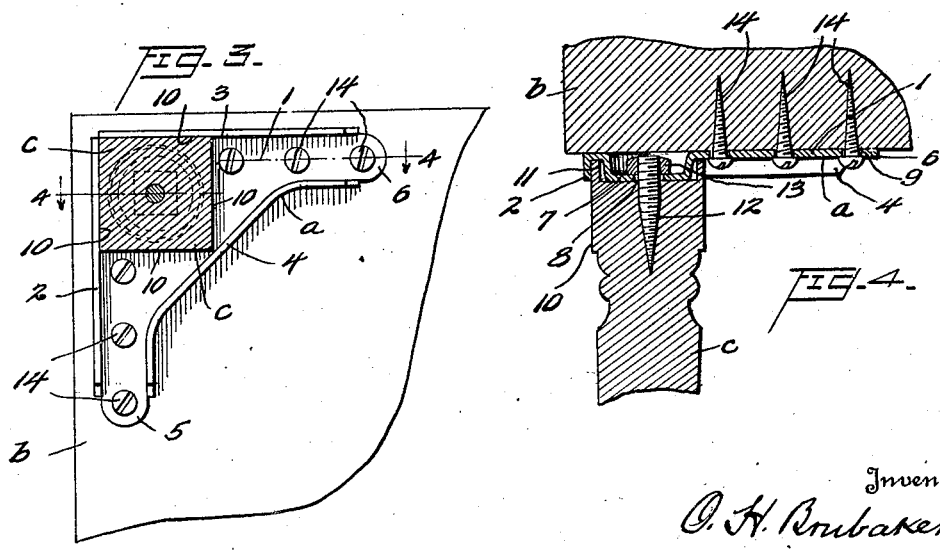
Inventor
O. H. Brubaker
By Robert Watson
Attorney Patented Oct. 29, 1929

1,733,859

UNITED STATES PATENT OFFICE

ORA H. BRUBAKER, OF RICHMOND, INDIANA, ASSIGNOR TO McCORMICK BROTHERS COMPANY, OF ALBANY, INDIANA, A CORPORATION OF INDIANA

FURNITURE-LEG ATTACHING PIECE

Application filed November 5, 1928. Serial No. 317,223.

The purpose of the present invention is to provide a simple and effective corner-piece for detachably connecting legs to various articles of furniture. The corner-piece is formed from sheet metal, with two of its edges meeting at a right angle, these edges having downwardly extending flanges, and it is also formed with a socket pressed downwardly from the body and adapted to enter a depression in the upper end of the leg, this socket having a central opening through which a screw, projecting upward from the leg, extends. A nut mounted upon the screw and lying below the upper surface of the corner-piece, within the socket, detachably connects the corner-piece to the leg. The leg is provided with angular faces which lie against the right-angled flanges of the corner-piece, and said flanges prevent the leg from turning with respect to the corner-piece. When the corner-piece is applied to the furniture with its right angled edges parallel with the adjacent sides of the latter, the angular faces of the leg are squared with the corner of the furniture. The corner-piece is secured to the furniture by wood screws and the leg and corner-piece can be readily attached or detached by inserting or removing the screws.

In the accompanying drawing,

Fig. 1 is a side elevation of a leg connected to an article of furniture by one of the corner-pieces;

Fig. 2 is a top perspective view of a corner-piece;

Fig. 3 is a section on the line 3—3 of Fig. 1, looking upwardly; and,

Fig. 4 is a section on the line 4—4 of Fig. 3.

Referring to Fig. 1 of the drawing, *a* represents one of the corner-pieces, *b* indicates the bottom part of a piece of furniture, and *c* indicates a leg which is attached to an article of furniture by the corner-piece.

The corner-piece, as shown in Figs. 2–4 of the drawing, is made from a sheet metal blank and comprises a body portion 1, of general triangular shape, having flanges 2 and 3 along two of its edges, meeting at a right angle, and preferably having a flange 4 extending along the edge which forms the base of the triangle. The body of the corner-piece has relatively narrow extensions 5 and 6, at two of its corners, and the flanges follow these extensions, as shown.

The body of the metal plate is pressed downwardly to form an annular socket 7, the center of which is equidistant from the flanges 2 and 3, and a circular opening 8 is formed in the center of the socket. The plate also has rows of openings 9 extending parallel with the flanges 2 and 3 to receive screws for attaching the plate to an article of furniture.

The upper part of the furniture leg *c* has angular faces 10, and the upper end of the leg has a socket 11, to receive the socket of the corner-piece. The corner-piece is secured to the leg by a screw 12, which is threaded into the leg and projects upwardly through the opening in the center of the socket 11, and a nut 13, which is applied to the projecting end of the screw, the nut and upper end of the screw being below the upper surface of the corner-piece. The angular faces of the leg fit against the flanges 2 and 3, and these flanges prevent the leg from turning with respect to the corner-piece, both while the latter is being applied to the leg and afterward, while the leg is in position under the furniture. The corner-piece is detachably secured to the article of furniture *b* by wood screws 14, which pass through the openings 9. When the flanges 2 and 3 are squared with the corner of the article of furniture, the angular faces of the leg will also be squared with the furniture.

In order to remove the legs from the furniture for packing or shipment, it is only necessary to remove the wooden screws, and any unskilled person can replace the legs by placing them in position and re-inserting the screws. The function of the flange 4 is merely to strengthen the plate, while the other flanges strengthen the plate and have the additional functions mentioned above.

What I claim is:

1. A corner-piece for detachably connecting legs to furniture comprising a metal plate having flanges meeting at a right angle and projecting downwardly from two of its edges and having a downwardly depressed part forming a circular socket and a central opening at the center of the socket, said socket being equidistant from said flanges, in combination with a leg having a socket in its upper end for receiving said depressed part in the plate and having angular faces adapted to fit against said flanges, and a screw extending through the opening in the plate and into the leg for securing the plate to the leg.

2. A corner-piece for detachably connecting legs to furniture comprising a metal plate having flanges meeting at a right angle and projecting downwardly from two of its edges and having a downwardly depressed part forming a circular socket and a central opening at the center of the socket, said socket being equidistant from said flanges, in combination with a leg having a socket in its upper end for receiving said depressed part in the plate, a screw threaded into the leg and extending through the opening in the plate, and a nut within the socket of the plate and threaded on to said screw.

In testimony whereof I affix my signature.

ORA H. BRUBAKER.